Patented Oct. 25, 1949

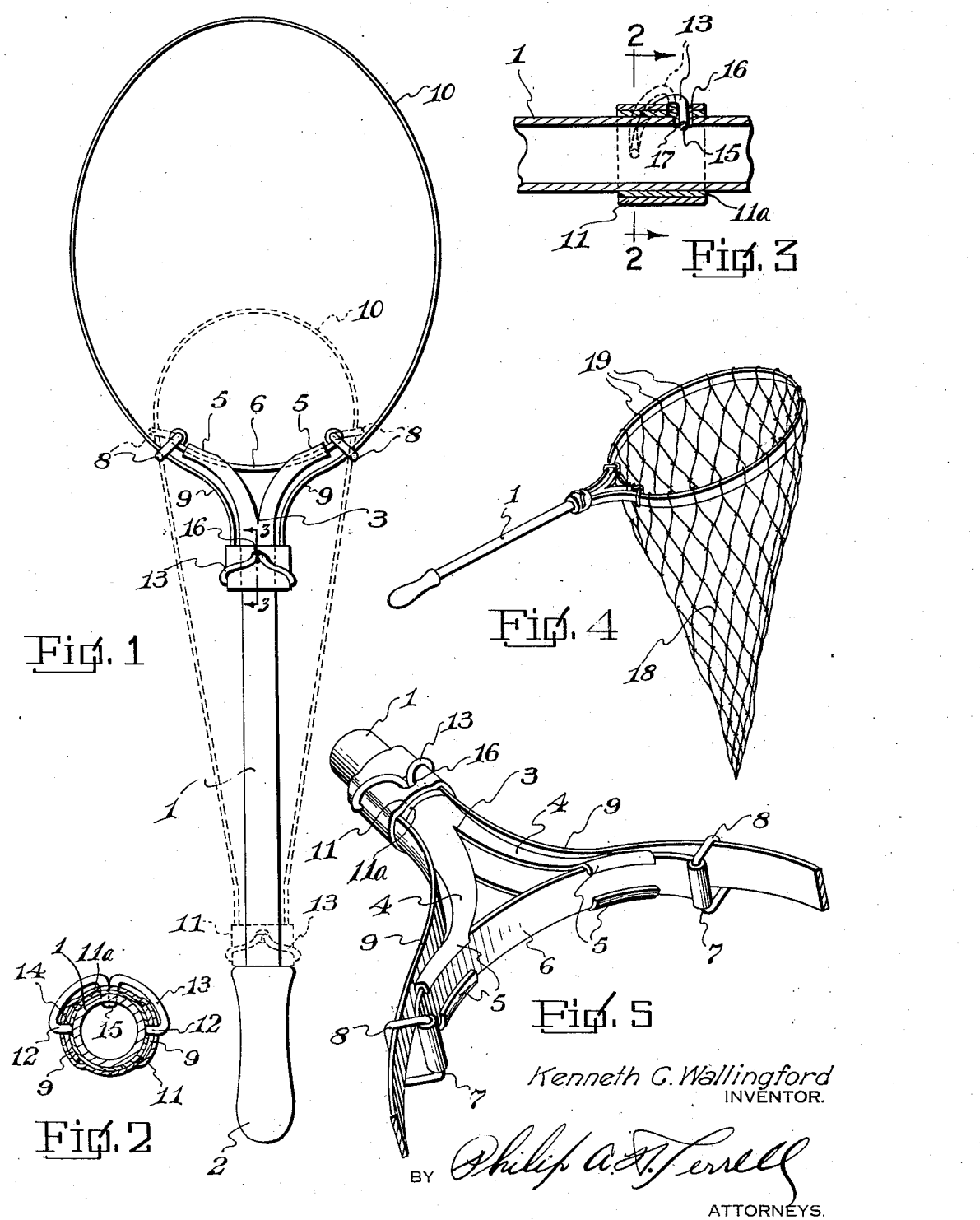
Oct. 25, 1949. K. C. WALLINGFORD 2,486,233
FOLDABLE DIP NET
Filed July 24, 1947
Kenneth C. Wallingford
INVENTOR.
ATTORNEYS.

2,486,233

UNITED STATES PATENT OFFICE 2,486,233

FOLDABLE DIP NET

Kenneth C. Wallingford, Tulsa, Okla.

Application July 24, 1947, Serial No. 763,317

2 Claims. (Cl. 43—12)

The invention relates to dip nets of the type used by fishermen and has for its object to provide a collapsible net, which can be collapsed into a small package for storage and shipment purposes.

A further object is to provide a dip net having its net frame formed from a flexible band, the ends of which band extend through pivoted loops and detachably connected to a slidable collar mounted on the handle of the net.

A further object is to form the slidable collar from two rings, one around the other, for the reception of the apertured ends of the net band, and a latching member extending through the apertures of the band end and apertures in the ring for holding said parts together so they can be easily detached; said latching member also having a lug adapted to be received in an aperture in the slidable collar and a registering aperture in the tubular handle.

A further object is to form the handle from tubular material, split at its outer end to form gripping members for holding the arcuate bar having the pivoted frame guide loops.

With the above and other objects in view the invention resides in the combination and arrangement of parts as hereinafter set forth, shown in the drawing, described and claimed, it being understood that changes in the precise embodiment of the invention may be made within the scope of what is claimed, without departing from the spirit of the invention.

In the drawing:

Figure 1 is a plan view of the dip net.

Figure 2 is a transverse sectional view, taken on line 2—2 of Figure 3.

Figure 3 is a longitudinal sectional view through the slide member, taken on line 3—3 of Figure 1.

Figure 4 is a perspective view of the dip net.

Figure 5 is a detail perspective view of the forward end of the handle member and net band mounting.

Referring to the drawing, the numeral 1 designates the tubular handle of the dip net, and 2 a hand grip carried by the inner end. The outer end of the tubular handle is split, as shown at 3, and the split portions 4 are curved outwardly and forwardly and terminate in gripping flanges 5 for holding the arcuate bar 6. Pivotally connected at 7 to the outer ends of the bar 6 are guide loops 8 in which the inner ends 9 of the flexible net frame 10 are slidably mounted. Loops 8 assume the dotted and full line positions, as shown in Figure 1, when the net is collapsed or extended, and by pivoting the loops 8 they will assume the proper positions during the extending or collapsing operation.

The inner ends 9 of the net frame extend between the slide collars 11a and 11, one collar encircling the other, as shown in Figure 2. Frame ends 9 are held between the collars 11 and 11a by the inturned arms 12 of the latching member 13, said arms extending through registering apertures 14 in the collars and arms 9. Latching member 13 arches the upper side of the slide collar 11 and is bent to form a downwardly extending lug 15, which passes through registering apertures 16 in the slide collars and when the net is extended through an aperture 17 in the upper side of the handle 1 for holding the net frame extended as shown in full lines in Figure 1.

It will be noted, by detaching the latching member from the slide collar by springing outwardly the sides thereof, that one or both ends of the flexible frame 10 may be released for placing the net 18 on the frame. The net is preferably provided with loops 19 for receiving the frame, hence it will be seen that the net can be removed from time to time, if desired, or for renewal purposes.

From the above it will be seen that a dip net is provided which can be easily collapsed, and one wherein the parts have been reduced to a minimum.

The invention having been set forth what is claimed as new and useful is:

1. A dip net comprising a handle member, a flexible net bow carried by one end of said handle member, a slide collar mounted on the handle member, the ends of said bow being detachably connected in said slide collar, the outer end of the handle terminating in forwardly diverging arms, pivoted loops carried by said diverging arms, and through which the ends of the bow extend and are guided to contracted or extended form, said handle member being formed from tubular material split at its outer end to form the forwardly diverging arms, and a segment anchored in the ends of said diverging arms, said pivoted loops being pivotally connected to the outer ends of said segment.

2. A dip net comprising a handle member having an aperture in the upper side thereof adjacent its outer end, a flexible new bow carried by the outer end of said handle member, said bow having spaced arms terminating at opposite sides of the outer end of the handle member, an inner slide collar surrounding said handle and having apertures at opposite sides thereof and at the top thereof, an outer collar surrounding the inner collar and having opposite apertures therein and in the upper side thereof, said apertures of both of said collars registering, the ends of said bow being disposed between said inner and outer collars at opposite sides of the handle and having apertures registering with the registering apertures of the collars, the outer end of the handle terminating in forwardly diverging arms, pivoted loops carried by said diverging arms and through which the ends of the bow extend and are guided to contracted or extended form, and a latching device carried by the collars, said latching device arching the upper side of the outer collar, said latching device having inturned lugs pivotally mounted in the registering apertures in opposite sides of the inner and outer collars and in the apertures in the arms of the bow, said latching device having a downwardly extending lug positioned to be received in the registering apertures in the upper sides of the inner and outer collars and also positioned whereby the lug will be located in the aperture in the upper side of the handle adjacent its outer end when the collars are moved outwardly for extending the bow.

KENNETH C. WALLINGFORD.

REFERENCES CITED

The following references are of record in the file of this patent:

UNITED STATES PATENTS

| Number | Name | Date |
|---|---|---|
| 270,641 | Dodge | Jan. 16, 1883 |
| 662,960 | Payton | Dec. 4, 1900 |

FOREIGN PATENTS

| Number | Country | Date |
|---|---|---|
| 5,674 | Great Britain | 1889 |